US008482563B2

(12) United States Patent
Lebedev

(10) Patent No.: US 8,482,563 B2
(45) Date of Patent: Jul. 9, 2013

(54) EQUITIES INFORMATION AND VISUALIZATION SYSTEM THAT PROCESSES ORDERS AS INFORMATION IS RECEIVED VIA DATA FEED IN REAL-TIME

(75) Inventor: Alexei Lebedev, New York, NY (US)

(73) Assignees: Algo Engineering LLC, New York, NY (US); Magic Works LLC, New York, NY (US)

( * ) Notice: Subject to any disclaimer, the term of this patent is extended or adjusted under 35 U.S.C. 154(b) by 1453 days.

(21) Appl. No.: 10/644,904

(22) Filed: Aug. 21, 2003

(65) Prior Publication Data

US 2005/0044031 A1 Feb. 24, 2005

(51) Int. Cl.
*G06T 11/20* (2006.01)

(52) U.S. Cl.
USPC .......................................... 345/440; 345/418

(58) Field of Classification Search
USPC .................... 345/440, 440.2, 418; 705/37
See application file for complete search history.

(56) References Cited

U.S. PATENT DOCUMENTS

| 5,297,031 | A | * | 3/1994 | Gutterman et al. | 705/37 |
|---|---|---|---|---|---|
| 7,212,999 | B2 | * | 5/2007 | Friesen et al. | 345/440.2 |
| 7,218,325 | B1 | * | 5/2007 | Buck | 345/440.2 |
| 7,250,951 | B1 | * | 7/2007 | Hurley et al. | 345/440 |
| 7,542,940 | B2 | * | 6/2009 | Burns et al. | 345/440 |
| 7,928,982 | B1 | * | 4/2011 | Perttunen | 345/440 |
| 2002/0054040 | A1 | * | 5/2002 | Moshal et al. | 345/440 |
| 2002/0130868 | A1 | * | 9/2002 | Smith | 345/440 |
| 2003/0009411 | A1 | * | 1/2003 | Ram et al. | 705/37 |
| 2003/0055776 | A1 | * | 3/2003 | Samuelson | 705/37 |
| 2004/0179011 | A1 | * | 9/2004 | Marshall | 345/440 |
| 2005/0075965 | A1 | * | 4/2005 | Cutler | 705/37 |
| 2007/0005488 | A1 | * | 1/2007 | Keith | 705/37 |
| 2010/0287114 | A1 | * | 11/2010 | Bartko et al. | 705/37 |

* cited by examiner

*Primary Examiner* — Chante Harrison
(74) *Attorney, Agent, or Firm* — Straub & Pokotylo; Michael P. Straub; Stephen T. Straub

(57) ABSTRACT

A system and method for graphically displaying the lifetimes of individual orders, quotes and trades as they are received via data feed in real-time from a market center or data provider are described. The system displays the market on a two dimensional canvas with orders, trades, and prices represented by graphic symbols that allow the trader to follow the movement and fluctuation of the market with ease. The trader can place his orders and view them in context of all the other orders. The trader can then enter and cancel orders using this display and the special hints it provides. The orders can be routed to a specific destination based on the information entered via this display by mouse, keyboard, or joystick.

25 Claims, 3 Drawing Sheets

(Execution Window)

EQUITIES INFORMATION AND VISUALIZATION SYSTEM THAT PROCESSES ORDERS AS INFORMATION IS RECEIVED VIA DATA FEED IN REAL-TIME

FIELD OF THE INVENTION

The present invention generally relates to computer systems for trading and analyzing selected equities, and more particularly, software that displays securities trading information and order placement from various alternative trading systems ("ATS"), such as electronic communication networks ("ECN"), and NASDAQ.

BACKGROUND OF THE INVENTION

There are currently three primary types of computer accessible trading systems for securities such as stocks, bonds, commodities and derivatives. The first is the conventional stock exchange system exemplified by the New York Stock Exchange and New York Mercantile Exchange.

The second system is electronic exchanges. Electronic exchanges utilize electronic access of dealer posted market prices without a negotiating specialist or floor based exchange. The largest of these is NASDAQ. It is a totally computer-based market where each member dealer can make its own market in the stocks traded on the exchange through a computer network.

The best bid to buy by and the best offer to sell for a security is called the security's "inside market." NASDAQ supplies trading data to the participants via a computer network at three different service levels, known as Level I, Level II and Level III. Level II allows real-time access to the following data: (1) Inside market quotes (highest bid and lowest offer) for listed securities, (2) individual market maker quotations, as well as inside quotes for OTC Bulletin Board listed securities, (3) trade price and volume data. Level III is a service limited to member dealers, allowing them to provide NASDAQ with their best bid and offer for securities in which they make markets, and receive incoming orders. There are various systems for displaying Level II and III data, such as disclosed in U.S. Pat. No. 5,297,032 to Trojan et al., issued Mar. 22, 1994.

The third trading system is alternative trading systems ("ATS") which provide ATS members and electronic exchange users, such as NASDAQ users, an electronic network by which they may display and execute their orders independent of a market maker or specialist. By doing so, members avoid conventional fees while enjoying more current and complete market information. ATSs are presently regulated under SEC Rule 17(a)(3) and 17(a)(4) as they apply to broker/dealer internal trading systems. Currently the most popular ATSs are ECNs. There are currently more than five ECNs. Island, Instinet, Archipelago, B-trade, Brut etc.

Each member of an ECN has a trading terminal that is connected with the ECN's central order book computer. Members display their bids and offers and conduct transactions through the resulting network. The ECN's order book computer keeps track of bid/offer information including price, volume, and execution for each open and closed transaction as supplied to it in real time by its members. The order book computer also records which computer, and thus, which member posted each bid or offer. Once a bid is hit or an offer is taken through the central order book computer, the central order book and members' trading terminals are thus updated and the accepted bids and offers are no longer displayed.

In a conventional stock exchange or an electronic exchange, buyers and sellers are subjected to intermediaries in the transaction, i.e., respectively the specialist or the market maker dealing in a particular security. However, in an ECN, each bid and offer is a discrete and anonymous order, fully viewable by and accessible to all its members.

The member controls through its trading computer all aspects of trading securities including order entry, price, volume, duration and cancellation. The member may, at its discretion, select desirable transactions from all open orders available as displayed from the ECN's central order book. The member may choose from the inside market for the security or at a worse price outside of the inside market. Such freedom is highly desirable. For example, it may be a wise strategy to buy securities at a price equal to or higher than the best offer in order to obtain more shares than the inside offer is displaying. This strategy also recognizes that the inside market is moving quickly and may not be available when trying to take the best offer.

All the open orders, trades and market fluctuations are being updated constantly and a market feed consisting of a series of these updates is sent to each subscriber. There is however the monumental problem of displaying this information in a way that could be interpreted by the trader to create a mental picture of the fluctuating market. The trader has a difficult time deciphering what other participants are doing, what a good price for a buy or a sell order would be, which market to send that order to, and in case of larger orders, what size to specify for the order to convey the right information.

In U.S. Pat. No. 6,278,982 granted to Richard A. Korhammer of Lava Trading Inc. a display is presented consisting of a sorted list of orders inside a window dedicated to the particular stock symbol. The list shows the market participant ID, order size, and order price. Buy orders are listed on the left, and sell orders on the right.

The best bid and offer are on the top, with other participants' quotes (with less favorable prices) shown below. As order records arrive, this display is updated. A modern computer has no problem keeping up with the market feed, and can display a dozen of these order books with less than 1% of CPU used.

Trade records are not reflected in this display, and are usually displayed in a scrolling list on the side.

It can be difficult to keep track of what's going on by looking at flickering lines of quotes moving around as trades occur, new orders are added, and old orders cancelled and removed. Some typical enhancements include the following:

Orders are divided by price, and orders with the same price grouped to one line. When two orders are grouped, their sizes are added up. The background color can also be used to show the grouping of orders by price. The trader can set the order book's parameters to see a quote from a particular market center on top, regardless of price. The color coding could be set to display orders grouped by size instead (orders accounting for the first 10,000 shares are colored green, the next 10,000 shares are red, etc.)

OBJECTS

It is an object of the present invention to provide a system for graphically visualizing orders and trades of a market or several markets in real-time.

It is further an object of the present invention to display each order, quote or trade on a two-dimensional scrolling canvas as a distinguished graphical mark. The Y coordinate corresponds to price and the X coordinate indicates the time of the event, such as when the trade took place, an order was entered and removed from the market.

An additional object of the present invention is allowing a trader, through varying zoom levels to view various price and time scales of the market.

Another object of the present invention is allowing the trader to enter orders by interacting with the screen where a special graphical mark represents the order currently being composed, and adjusting the intended price or time of order placement by means of mouse, keyboard or joystick.

Yet another object of the present invention is to provide varying visual attributes, such as extent thickness, color or variation in shape of each graphical mark representing an attribute such as order intention (buy or sell), order age, order size, the type of trade, or trade volume.

A further object of the present invention is to display the trader's own active and recent orders and trades alongside the other participants' orders in a way that distinguishes them from the rest and allows the trader to make a visual comparison.

An additional object of the present invention is to provide a system of graphically visualizing order books of multiple markets as vertical bands with each band displaying orders originating from a specific market, and the price of each order being indicated by the Y coordinate of its distinguished graphical mark.

It is an object of the present invention to provide the trader with the ability to enter orders targeted to a specific market center by moving a special graphical mark inside a corresponding vertical band. The vertical movement being used to adjust the limit price.

It is a further object of the present invention to give trader ability to have his order sent, cancelled and re-sent to the market by predetermined user action. The trader can do so by the pressing of a joystick button or keyboard key, and interactively, whenever the price, size or any other parameter of the composed order changes.

Yet another object of the present invention is to give the trader ability to enter orders that will be automatically routed to a market center of the system's choice. The trader clicks in a special auto-route band and the computer chooses a destination with the fastest response time, and the best price.

SUMMARY

In the present invention the objects are achieved through the use of a computer system where the order book is displayed graphically. In our visualization each order is shown as a horizontal line with the Y coordinate representing the price and the X coordinate representing time. The line extends from the point where the order was received to the point when it was removed, or to the edge of the screen if the order is currently active. The order book is thus represented as a collection of disjointed lines each representing an order. This allows the trader to observe the dynamics of the market.

The trade records are shown as points (events) on the same mapping scheme as the order records. In the traditional display the trader had to scan the trade record list and the order book to determine where relative to the BBO (National best bid and offer) trades were taking place. At any point in time the actual price of a security was not known to anyone. All one could determine was that the security could be bought at the best offer price and sold at the best bid price. The space between the bid and offer was the uncertainty region. Our trade record displays all the trades happening at any given time and thus can show the trader that when enough trades occur on the bid side the price goes down and when enough trades occur on the offer side the price goes up. Thus the present invention locates the true price to a greater precision.

The system allows the trader to interact with the market instantaneously by means of a graphic user interface that allows him to enter orders, make trades and cancel orders by the a mere click of a button. The trader can thus respond to fluctuations in security price with a superior knowledge of where the market is headed.

A system and method for graphically displaying the lifetimes of individual orders, quotes and trades as they are received via data feed in real-time from a market center or data provider are described. The system displays the market on a two dimensional canvas with orders, trades, and prices represented by graphic symbols that allow the trader to follow the movement and fluctuation of the market with ease. The trader can place his orders and view them in context of all the other orders. The trader can then enter and cancel orders using this display and the special hints it provides. The orders can be routed to a specific destination based on the information entered via this display by mouse, keyboard, or joystick. In some embodiment the trader is provided an opportunity to enter orders that will be automatically routed to a market center of a computer's choice by said trader clicking in a special auto-route band; and having the computer choose a destination that has the fastest response time and the best price.

BRIEF DESCRIPTION

DETAILED DESCRIPTION

Figure 1:
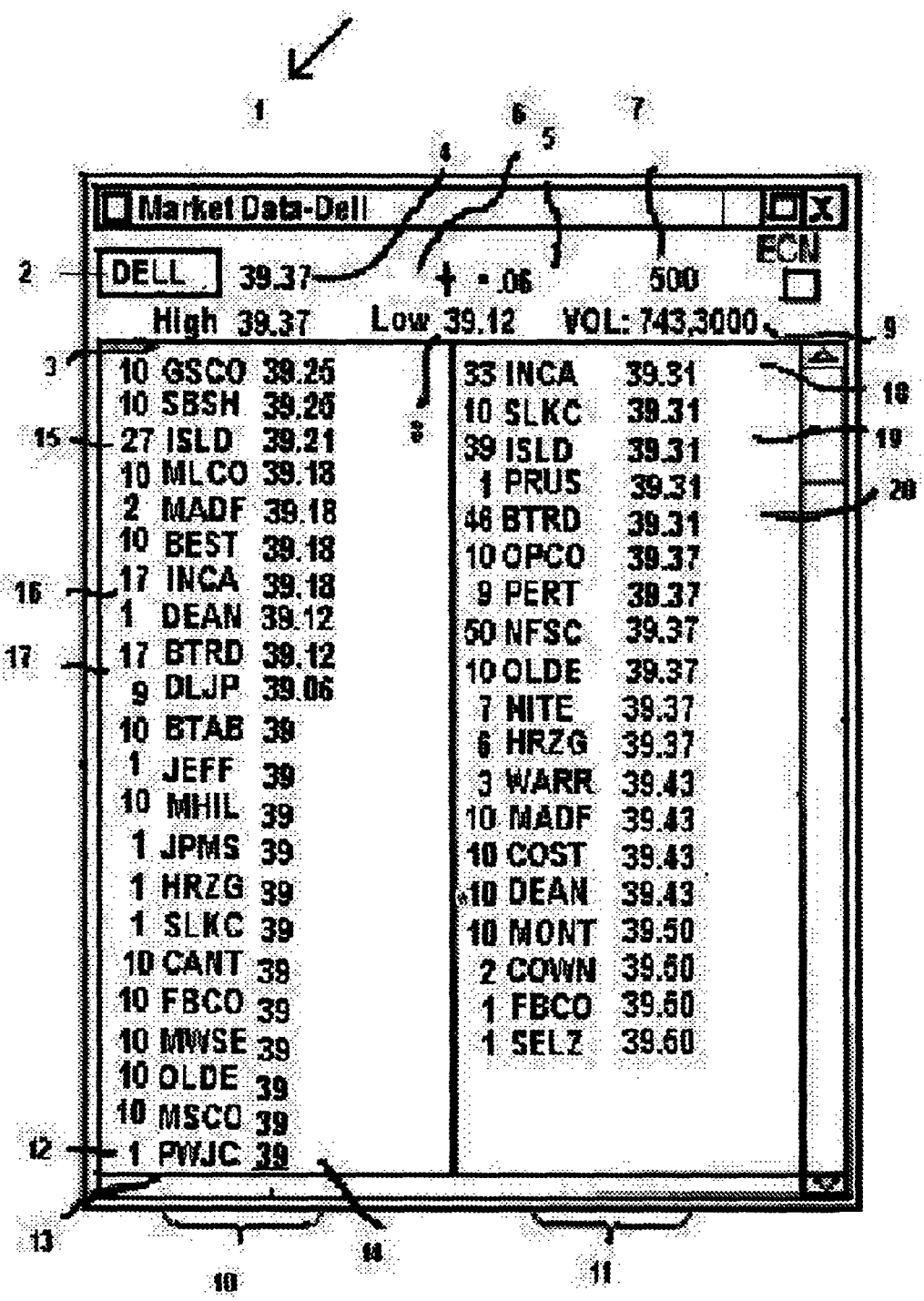
FIG. 1 is an order book display of the prior art.

FIG. 1 shows, how before the present invention a trader would look at market screen 1. Here the customer has elected to receive NASDAQ data. Thus screen 1 displays NASDAQ level I and II information. The security under review is Dell Computer Corp. The security was elected by inserting its ticker symbol DELL in space 2. NASDAQ level I information 3 is displayed at the top of screen 1, including the last trade price 4, an arrow indicating the current movement of the highest bid 5, the net change 6 of the last trade price with respect to yesterday's closing price, the volume of the last trade 7 and low 8 trade prices for the day, and the total volume traded for the day 9. Each screen also contains bid 10 and offer 11 data. The bids 12 are sorted in ascending order by price. For each quote, the following information is displayed: Volume in 100's of shares 12, the four character identification of the market maker or ECN 13, and the price 14. A * character is used to show the most recently updated quote. The grayed entries indicate the highest bid 15 and, 16, and 17 of three ECNs, Island, Instinet, and Arca and the lowest offer 18, 19, 20 of Instinet, Island, and Btrd. Screen 1 is thus showing us the traditional display of level II information.

Figure 2:
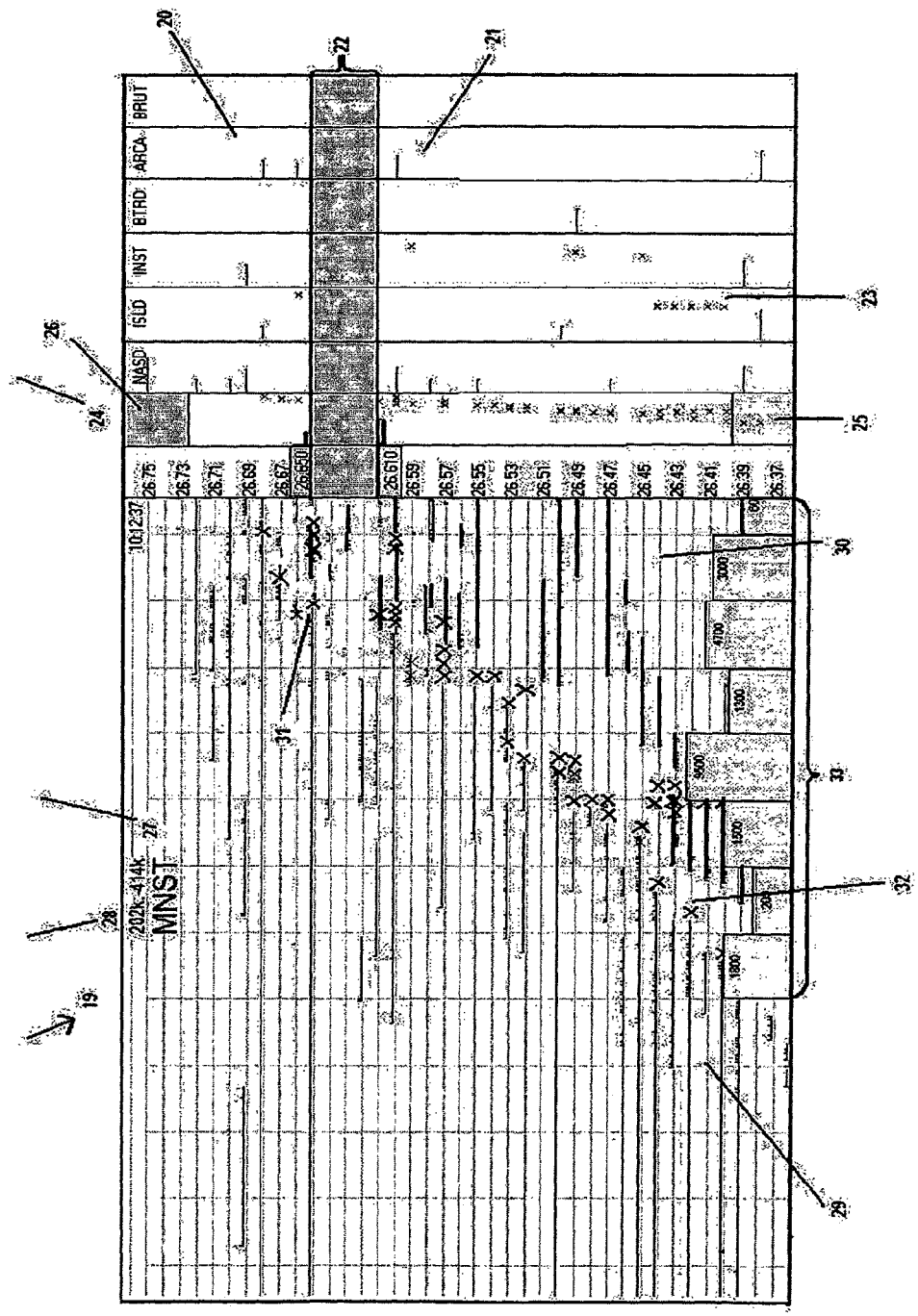
FIG. 2 is the graphical order book display of the present invention.

FIG. 2 shows the present invention. Order book 19 is graphically displayed so both sell offers 20 and buy offers 21 are displayed as lines, their thickness and length varying according to the size of the order. Shaded area 22 is the spread showing current best bid and buy offer available at the moment. X marks 23 display trades and information about the trades, for example the ECN they took place on, the amount of the trade, and where it took place relative to the inside of the market. Column 24 contains the buy bar 25 which can be dragged upwards to buy a security on a choice of ECN's and sell bar 26 which can be dragged downward to sell a security on a choice of ECN's and at price per share that the trader chooses. The left side of the screen is a thirty second history of order book 19. The security is indicated by its ticker symbol on the top of screen 27. As long as a sell order remains open it is tracked by red line 29 and as long as a buy order remains open it is tracked by green line 30. Every time the order was traded against is marked by red x 31 if the trade happened on the sell side and green x 32 if the trade happened on the buyer's side. The volume of shares traded is indicated by blocks 33 displayed on the bottom of the screen.

Figure 3:
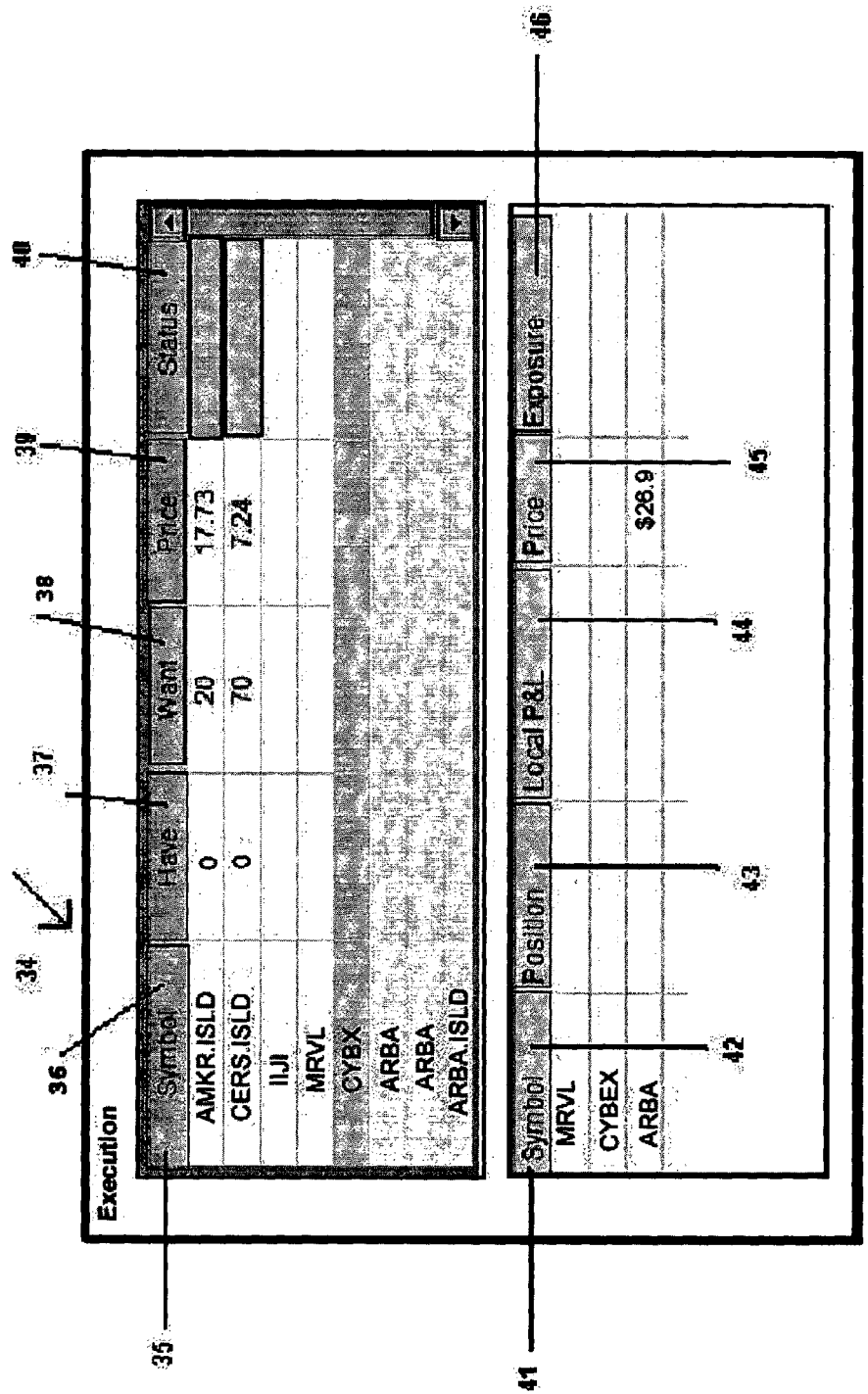
FIG. 3 is a representation of the execution window, which displays open orders, open positions and their current PNL.

FIG. 3 shows Execution window 34. Open orders table 35 is displayed on top. The ticker symbol of the security is displayed in column 36. The amount of shares already bought or sold is indicated in 'Have' window 37 and the amount of shares desired is in Want' window 38. The desired price per share is indicated in 'Price window 39' and open order status is indicated by the grayed area in 'Status' window 40. Table 41 displays open positions. 'Symbol' column 42 displays the security's ticker symbol. 'Position' column 43 displays the number of shares that have been shorted or bought and the price the transaction happened at. 'Local P&L' column 44 displays the real-time total profit or loss for the trade and 'Price' column 45 displays the current price per share. Finally the 'Exposure' column displays how many shares have been shorted or bought.

The invention claimed is:

1. An equities trading method, the method comprising:
presenting trading information including an order book on a display, said step of presenting trading information including:
displaying both orders and trades as distinguished graphical marks in a first portion of said display, said orders and trades being displayed as a function of both time and price, a horizontal axis of said first portion of the display corresponding to time, a vertical axis of said first portion of the display corresponding to price;
providing visual attributes to said graphical marks, at least one of said graphical marks being provided with a visual attribute from the group of attributes consisting of: i) line thickness, ii) color and iii) shape, the visual attribute applied to an individual graphical mark being based on at least one of: i) order intention, ii) order age, iii) order size or iv) trade volume, corresponding to the at least one of said graphical marks being provided with the visual attribute;
providing a trader an opportunity to click in an auto-route band to enter an order that will be automatically routed to a market center of a computer's choice; and
operating the computer to choose a destination for the order placed by clicking in the auto-route band that has the best price.

2. The method of claim 1, further comprising the steps of:
(a) providing a graphical mark on said display which said trader can manipulate along said vertical axis to adjust intended price and over said horizontal axis to adjust an intended time of placement;
(b) showing on said display said trader's own active orders, recent orders, and trades alongside other participants' orders in a manner that distinguishes active orders corresponding to said trader and trades from other participants in a market whereby said trader can make visual comparison.

3. The method of claim 2, further comprising:
providing said trader with an opportunity to route orders to a specific market center by moving a graphical mark inside a vertical band corresponding to said specific market center and to adjust a limit price by a vertical movement of said graphical mark.

4. The method of claim 1 wherein said display visualizes order books of multiple different markets in a second portion of said display, the order book of an individual market being shown as a vertical band, multiple vertical bands being shown side by side.

5. The method of claim 4 wherein each of said multiple vertical bands displays orders originating from a single market.

6. The method of claim 4 further comprising:
a vertical band including price information indicating prices along said vertical axis,
said indicated prices being applicable to both said first and second portions of said display.

7. The method of claim 4, further comprising:
providing said trader with an opportunity to route orders to a specific market center by moving a graphical mark inside the vertical band on said display corresponding to said specific market center.

8. The method of claim 7, further comprising:
providing said trader an opportunity to send, cancel and re-send an order to the specific market center by predetermined user action whenever price, size or another parameter of said order has changed.

9. The method of claim 1, further comprising the steps of:
(a) providing a graphical mark on said graphical display in real time which said trader can manipulate along said vertical axis to adjust intended price and over said horizontal axis to adjust an intended time of placement;
(b) showing on said graphical display in real time said trader's own active orders, recent orders, and trades alongside other participants' orders in a manner that distinguishes said trader's active orders and trades from other participants in a market whereby said trader can make visual comparison.

10. The method of claim 9, wherein said real-time graphical display visualizes order books of multiple different markets, the order book of an individual market being shown as a vertical band, multiple vertical bands corresponding to the different markets being shown on one side of said display as a real-time graphical display.

11. The method of claim 10, wherein each of said vertical bands displays orders originating from a single market.

12. The method of claim 10, wherein the price of orders are indicated on said vertical axis with distinguished graphical marks.

13. The method of claim 1, wherein displaying orders as distinguished graphical marks includes:
displaying an order as a horizontal line with the vertical position of said horizontal line indicating a price and the starting point of said line indicating when said order was received.

14. The method of claim of claim 13, wherein said horizontal line extends along said horizontal axis to a point corresponding to a time said order was removed or to a right edge of said first display portion if said order is pending.

15. The method of claim 14, wherein a thickness of said horizontal line indicates the size of said order.

16. The method of claim 14, wherein displaying trades as distinguished graphical marks includes:
displaying on said horizontal line a mark indicating a trade at a location corresponding to a point in time at which a trade corresponding to said order occurred.

17. The method of claim 16, further comprising:
displaying at the bottom of said first portion of said display volume information indicating the number of shares traded during the period of time to which the volume information corresponds.

18. An equities trading method, the method comprising:
presenting trading information including an order book on a display, said step of presenting the trading information including:
 displaying sell orders and trades in a first portion of said display using distinguished graphical marks, orders being displayed as horizontal lines, a starting point of a horizontal line representing an order corresponding to a time at which said order was received, the line thickness of said horizontal line corresponding to the order being a function of the size of the order to which the horizontal line corresponds;
 providing a visual attribute to at least one of said graphical marks, based on i) order intention, ii) order age, iii) order size or iv) trade volume, corresponding to said at least one of said graphical marks; and
 providing a user the opportunity to buy a security by moving an element displayed on the display.

19. The method of claim 18, wherein providing a user the opportunity to buy a security by moving an element displayed on the display includes:
providing the user the opportunity to drag a buy bar upward to buy a security.

20. The method of claim 19, further comprising:
displaying a sell bar which the user can drag downward to sell a security.

21. The method of claim 20, further comprising:
displaying the volume of shares traded as blocks displayed on the bottom of the display along a horizontal axis.

22. The method of claim of claim 18, wherein said horizontal line extends along a horizontal axis to a point corresponding to a time said order was removed or to a right edge of said first display portion if said order is pending.

23. The method of claim 22, wherein displaying trades as distinguished graphical marks includes:
displaying on said horizontal line a mark indicating a trade at a location corresponding to a point in time at which a trade corresponding to said order occurred.

24. The method of claim 23, further comprising:
displaying at the bottom of said first portion of said display volume information indicating the number of shares traded during the period of time to which the volume information corresponds.

25. The method of claim 23, further comprising:
displaying order books of multiple different markets in a second portion of said display, the order book of an individual market being shown as a vertical band, multiple vertical bands, corresponding to different individual markets, being shown side by side.

* * * * *